United States Patent
Balachandran et al.

(10) Patent No.: US 7,538,673 B2
(45) Date of Patent: May 26, 2009

(54) VOLTAGE REGULATION CIRCUIT FOR RFID SYSTEMS

(75) Inventors: Ganesh K. Balachandran, Irving, TX (US); Raymond E. Barnett, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 427 days.

(21) Appl. No.: 11/213,063

(22) Filed: Aug. 26, 2005

(65) Prior Publication Data

US 2007/0046474 A1 Mar. 1, 2007

(51) Int. Cl.
*G08B 13/14* (2006.01)
(52) U.S. Cl. ............... 340/572.1; 340/10.34; 375/316
(58) Field of Classification Search ... 340/572.1–572.9, 340/10.34, 10.33; 375/316, 345; 324/426–428; 323/224, 228, 282
See application file for complete search history.

(56) References Cited

U.S. PATENT DOCUMENTS

| | | | | |
|---|---|---|---|---|
| 4,629,964 A | * | 12/1986 | Ball | ..................... 320/134 |
| 4,968,941 A | * | 11/1990 | Rogers | ..................... 324/428 |
| 6,229,443 B1 | * | 5/2001 | Roesner | ..................... 340/572.1 |
| 6,380,721 B2 | * | 4/2002 | Pattamatta et al. | ..................... 323/269 |
| 6,509,722 B2 | * | 1/2003 | Lopata | ..................... 323/280 |
| 6,661,212 B2 | * | 12/2003 | Ostrom | ..................... 323/276 |
| 6,809,952 B2 | * | 10/2004 | Masui | ..................... 365/145 |
| 6,819,165 B2 | * | 11/2004 | Ho et al. | ..................... 327/541 |
| 7,015,680 B2 | * | 3/2006 | Moraveji et al. | ..................... 323/274 |
| 7,015,826 B1 | * | 3/2006 | Chan et al. | ..................... 340/870.17 |
| 7,023,189 B2 | * | 4/2006 | Peng et al. | ..................... 323/274 |
| 2006/0050541 A1 | * | 3/2006 | Terdan | ..................... 363/70 |

* cited by examiner

*Primary Examiner*—Benjamin C Lee
*Assistant Examiner*—Daniel Previl
(74) *Attorney, Agent, or Firm*—William B. Kempler; W. James Brady; Frederick J. Telecky, Jr.

(57) ABSTRACT

A voltage regulation circuit for an RFID circuit having a voltage limiter circuit including a current sensing element for sensing current through the voltage limiter circuit. The voltage limiter generates a limited voltage. A voltage regulator is coupled to the limited voltage for generating a regulated output voltage. The voltage regulator has a dynamic biasing current responsive to an output of the sensing element for increasing bandwidth of the voltage regulator when current in the voltage limiter circuit increases.

15 Claims, 8 Drawing Sheets

VOLTAGE REGULATION CIRCUIT FOR RFID SYSTEMS

TECHNICAL FIELD OF THE INVENTION

This Application relates to voltage regulators for RFID circuits and more specifically to voltage regulators for RFID circuits utilizing deep submicron CMOS technology.

BACKGROUND OF THE INVENTION

Radio Frequency Identification (RFID) Systems utilize "tags" which are attached to an object to be tracked and have been used in automated pay systems, and the tracking of animals or goods in inventory or in transit. These devices have been around since the 1970's but are burgeoning in the market because of the need for a system which tracks goods which does not need the direct contact that is required for a bar code reader, for example. Currently major retailers are planning on implementing the use of RFID tags on pallets in order to track inventory and plan to start using these on individual items, once the cost of the tags is reduced to about 5 cents per tag.

One way of reducing the cost per tag is to manufacture the tag so they take up very little real estate on the semiconductor wafer. Thus, tags will now be built using sub-micron ($\leq 0.2$ micron) CMOS technology. This results in a larger number of chips per wafer, and will enable the production of lower cost chips so that they can be more widely deployed.

Integrated circuit chips manufactured using sub-micron CMOS technology can not tolerate voltages above substantially 1.5 volts. In RFID tags that are built to operate off of the energy supplied by the radio frequency interrogation signal, the voltage induced in the tag can vary from zero volts when the radio frequency source is off to tens of volts when the tag is in close proximity to the interrogating transmitter. In addition, the voltage induced in the tag can be erratic as the tag moves in and out of proximity to the interrogating transmitter. This is a very different scenario than for battery operated systems, where a battery voltage may vary by a few volts over the life of the battery, but the variation will be relatively slow.

The received radio frequency signal from the interrogating transmitter is rectified to provide the power for the chip. FIG. 1 shows a crude clamp typically used in RFID systems at the output of the rectifier to provide a supply voltage VDD to the chip. The clamp has a series of diode connected transistors 102, 104, 106, 108 in series with the resistor 110 to ground. A diode connected transistor 112 is connected at the junction of transistors 104 and 106 to the gate of a bypass transistor 116 which is also connected via transistor 114 to the node between the source of transistor 108 and resistor 110. The gate of transistor 114 is tied to the node between transistors 106 and 108. When the current from the rectifier increases, the voltage drop across the resistor 110 increases, thereby increasing the voltage at node A and turning the bypass transistor 116 on strongly. The problem with this circuit is large variation, up to 1.5 volts, in the voltage VDD over process, temperature and radio frequency power variations. This variation is acceptable for certain technology, but will not be acceptable for deep sub-micron CMOS technologies because the maximum level of VDD is limited to 1.5 volts, and the circuits require 0.8 volts for proper operation.

A more accurate approach than the approach shown in FIG. 1 is shown in FIG. 2. The problem with the circuit shown in FIG. 2, is that at low values of current, the system is unstable. At low values of radio frequency power, the output resistance of the rectifier tends to be large and at high levels of radio frequency power, the resistance tends to be small. The loop gain can be expressed by the following:

$$LG1 = \frac{gm1}{sC1} \cdot gm2 \cdot Zeff \cdot \beta \qquad \text{Equation 1}$$

$$Zeff = Ra \| (R1+R2) \| \left(\frac{1}{sCL}\right), \quad \beta = \frac{R2}{R1+R2}$$

As shown by Equation 1, at low currents, Zeff is proportional to 1/(sCL) and the system has two poles and hence is potentially unstable. The only way to make the system more stable is to push the second pole farther away by decreasing the load capacitor CL. However, the load capacitor is utilized to supply current to the chip during times when no radio frequency power is being received, such as during a data "0". Therefore, decreasing the capacitor is undesirable because it will result in the collapse of VDD to unacceptably low value during this time, which will reset the part. Furthermore, the response time of this circuit is very slow. Therefore, when there is a sudden burst of radio frequency energy, the Norton current source dumps current and tries to increase VDD. The slew rate (Itail/Cl) is a fixed low value which is limited by the tail current sink, and the bypass device is turned fully on very slowly. Meanwhile, the voltage VDD can increase to a level where certain devices connected to it will be damaged.

SUMMARY OF THE INVENTION

It is a general object of the present invention to provide a voltage regulation circuit for an RFID circuit.

This and other aspects and features are provided, in accordance with one aspect of the present invention by a voltage regulation circuit for an RFID circuit comprising a voltage limiter circuit having a current sensing element for sensing current through the voltage limiter circuit, the voltage limiter current generating a limited voltage. A voltage regulator is coupled to the limited voltage for generating a regulated output voltage, the voltage regulator having a dynamic biasing current responsive to an output of the sensing element for increasing bandwidth of the voltage regulator when current in the voltage limiter circuit increases.

Another aspect of the invention includes a RFID transponder having a voltage regulator utilizing deep submicron components comprising an error amplifier having a first bias level when an input current is in a first range and a second bias level when the input current exceeds the first range. A pass transistor is coupled to an output of the error amplifier, whereby the voltage regulator is stable throughout its operating range.

A further aspect of the invention comprises a current limiter having a diode-connected transistor coupled between a voltage source and a reference potential. A plurality of current mirror-connected transistors are connected to the diode-connected transistor and have a current path between the voltage source and the reference potential. The plurality of weighting resistors, each resistor being connected in the current path of one of the plurality of current mirror-connected transistors.

BREIF DESCRIPTION OF THE DRAWINGS

Figure 3:
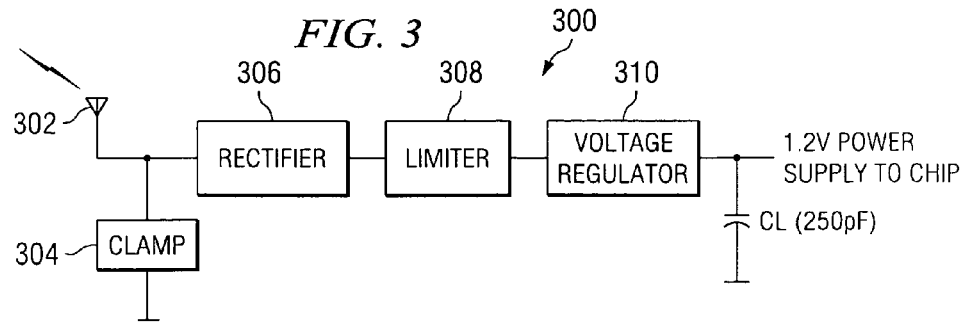
FIG. 3 is a block diagram of the circuit of the present invention.
Figure 4:
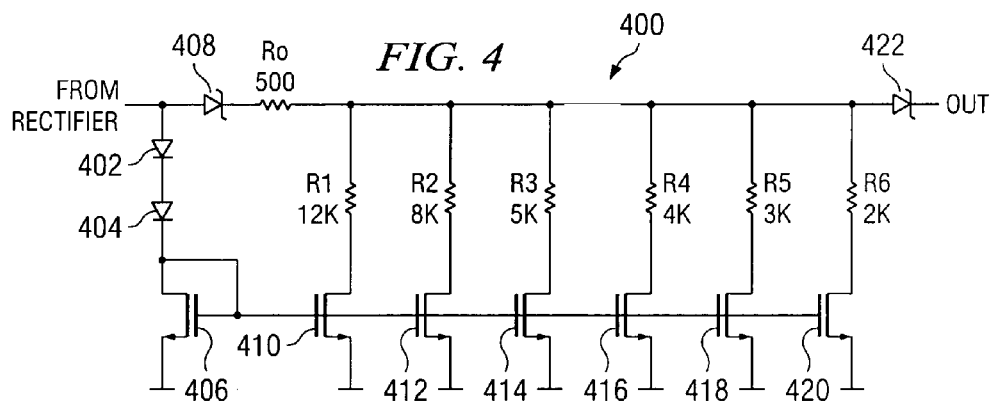
FIG. 4 is a schematic diagram of the limiter circuit shown in FIG. 3.
Figure 5A:
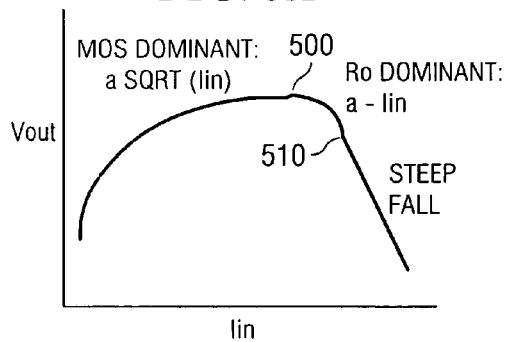
Figure 5B:
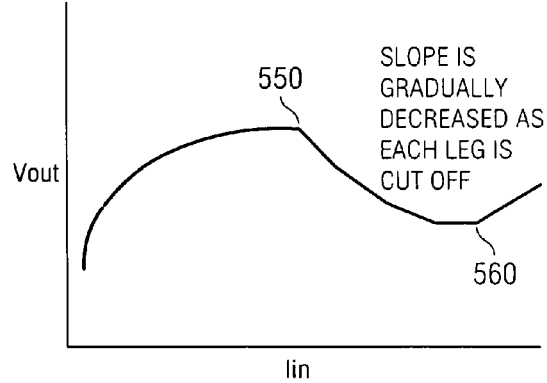
Figure 6:
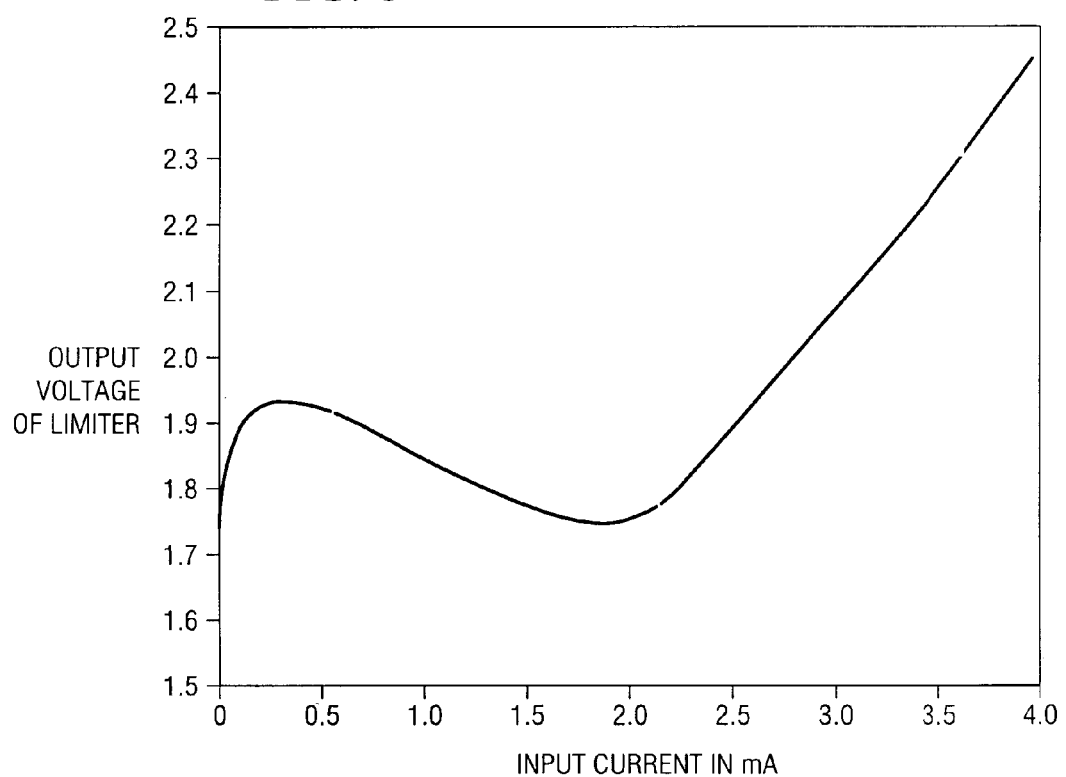
Figure 7:
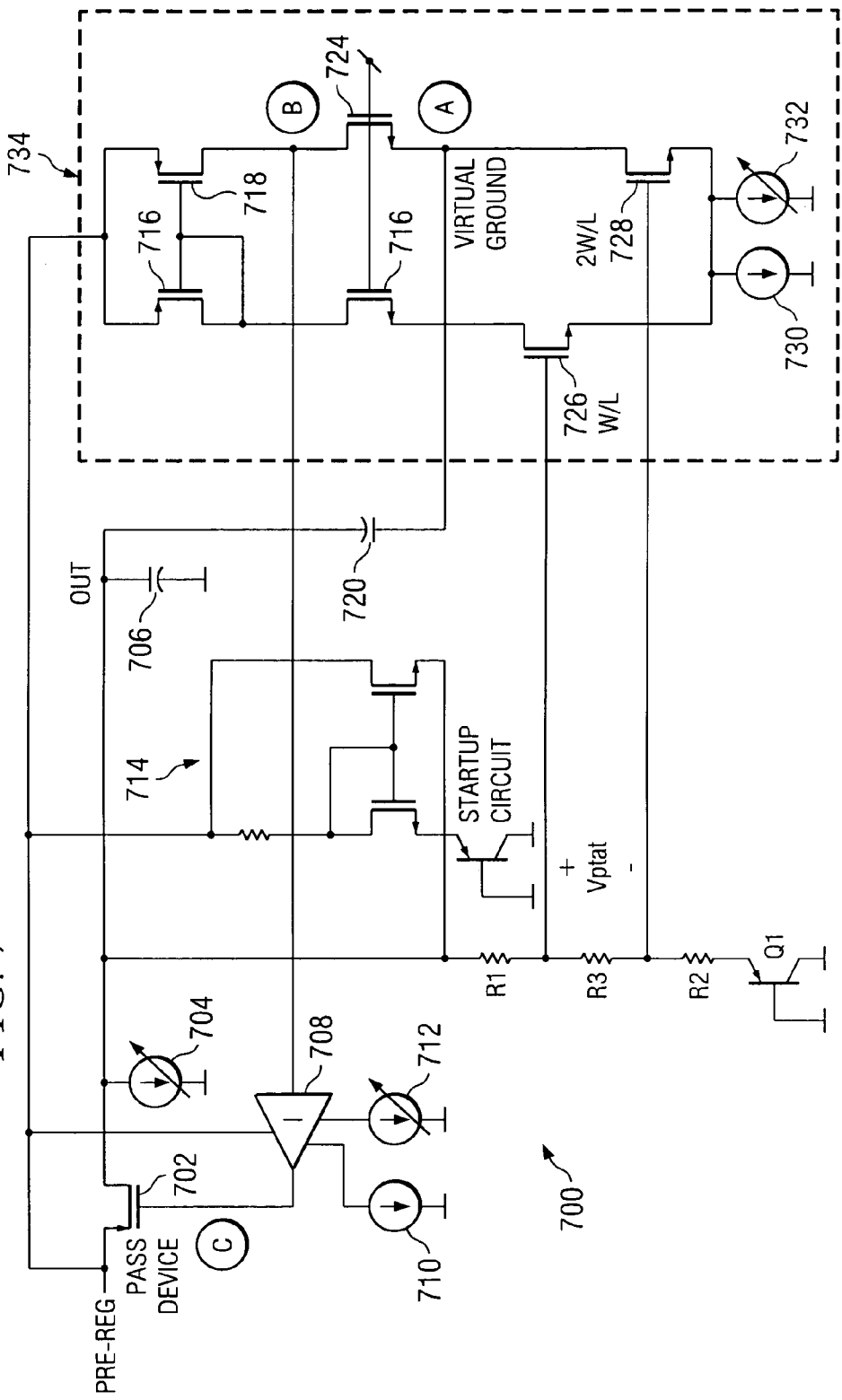
Figure 8:
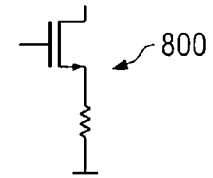
Figure 9:
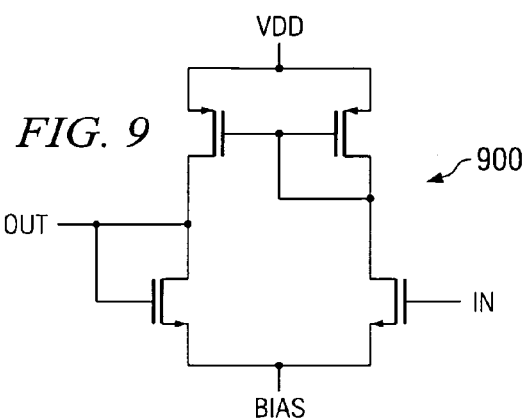
Figure 10A:
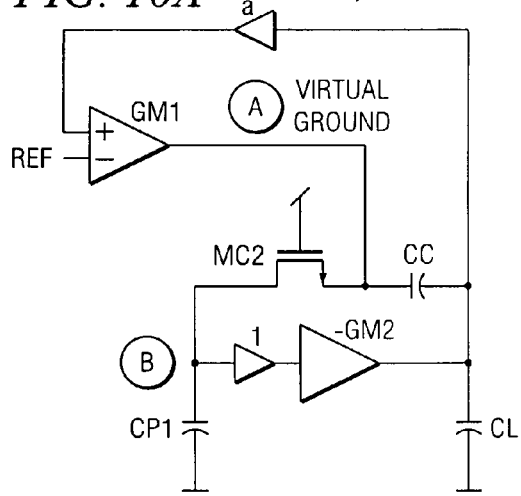
Figure 10B:
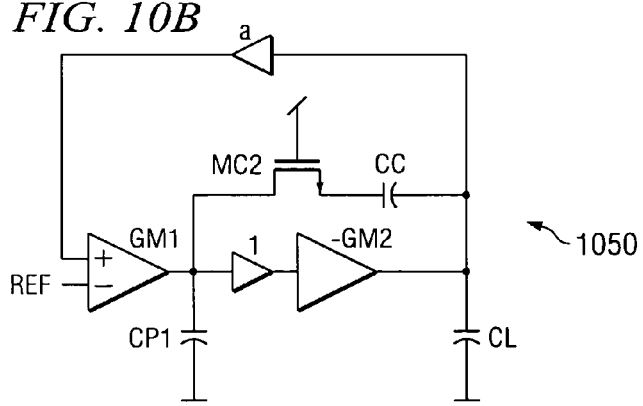
Figure 11:
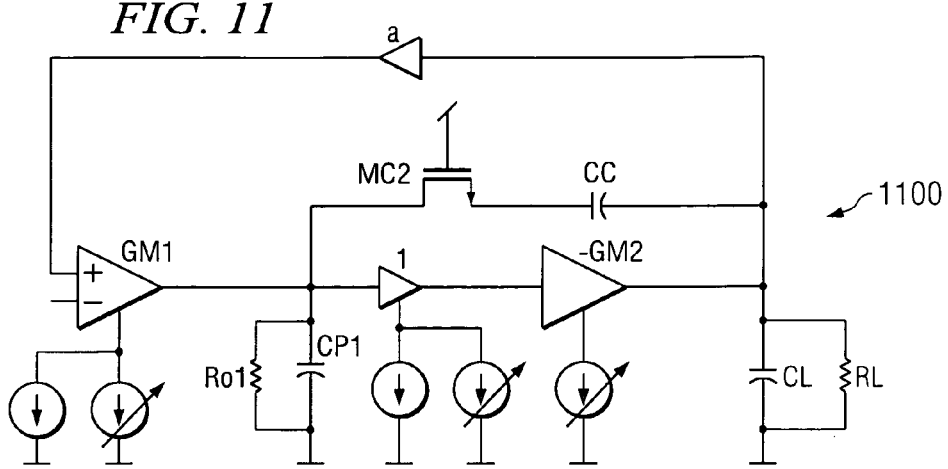
Figure 12:
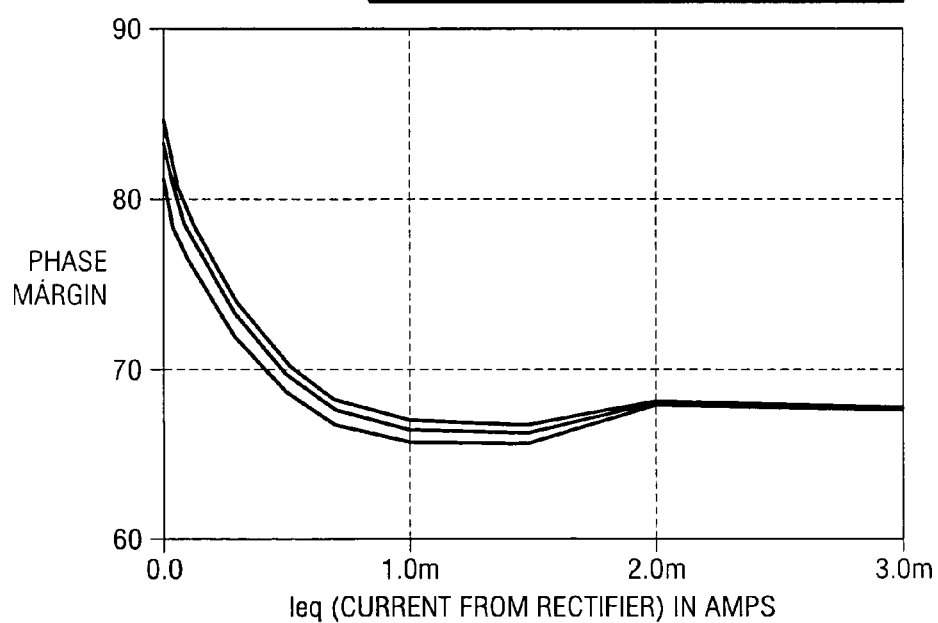
Figure 13:
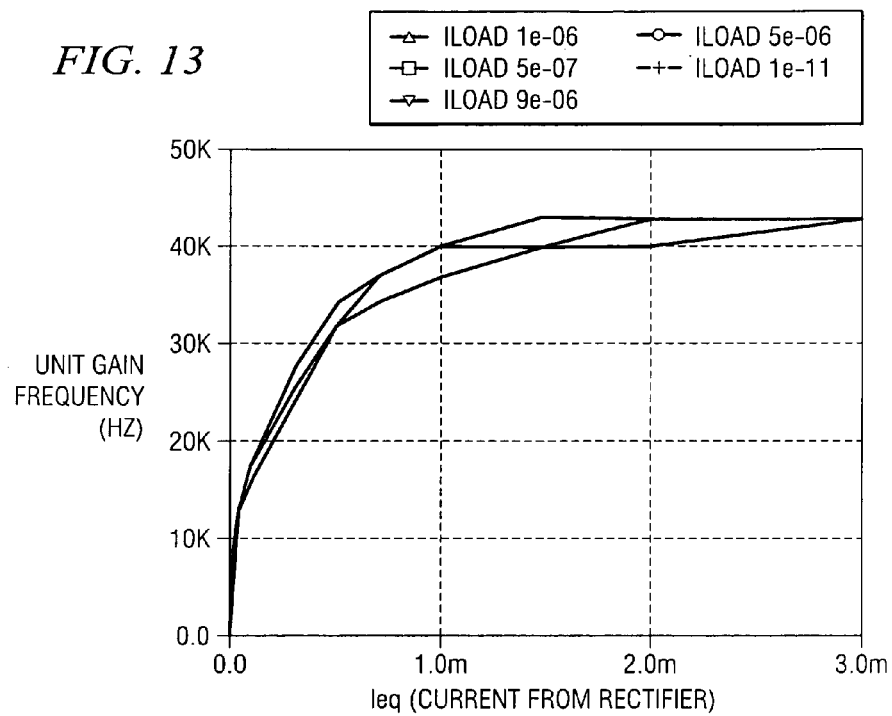
Figure 14:
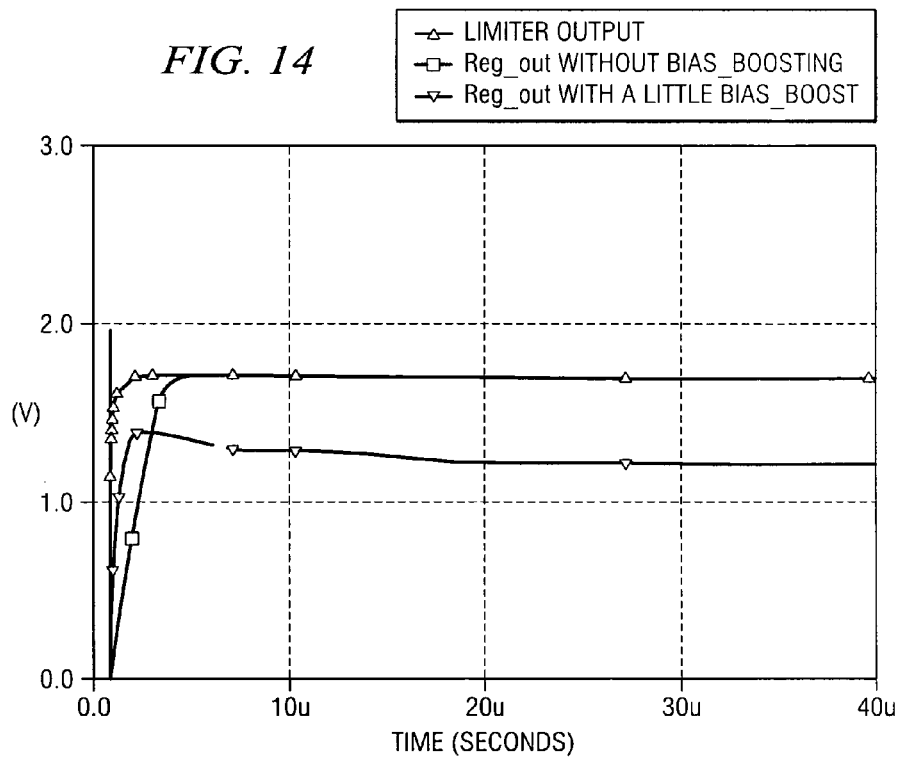
Figure 15:
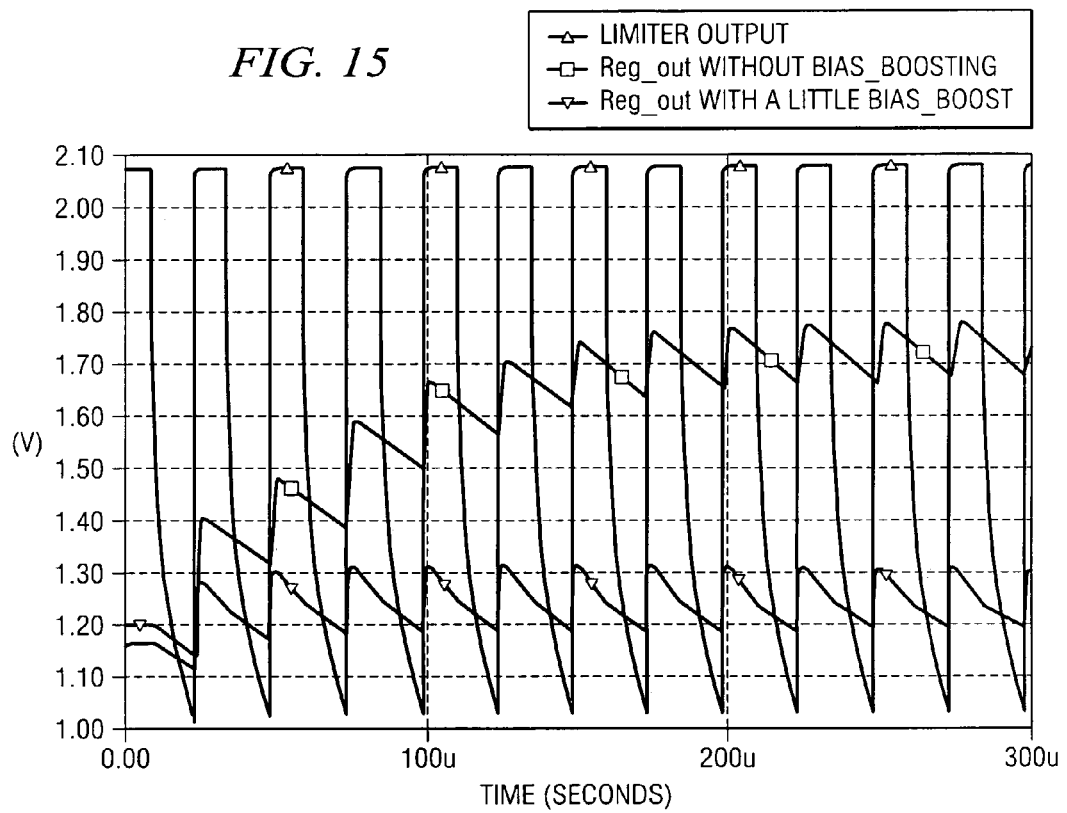

FIGS. 5(a) and 5(b) show the I-V characteristics of the limiter shown in FIG. 4 having one leg or multiple legs;

FIG. 6 shows the simulated nominal I-V characteristics of the limiter shown in FIG. 4;

FIG. 7 shows a schematic diagram of the regulator shown in FIG. 3;

FIG. 8 shows a dynamic current sink for use in the circuit of FIG. 7;

FIG. 9 shows a unity gain buffer for use in the circuit of FIG. 7;

FIG. 10(a) shows the actual implementation of the regulator feed-back loop,

FIG. 10(b) shows the simplification of the circuit in FIG. 10(a) to be suitable for stability analysis;

FIG. 11 shows a more detailed diagram of the feedback loop shown in FIG. 10(a) for loop gain analysis;

FIG. 12 shows the phase margin for $I_{ave}$ 11 µA to 3 mA;

FIG. 13 shows the unity gain frequency for $I_{ave}$ from 11 µA to 3 mA;

FIG. 14 shows the effect of a sudden surge of radio frequency power on the regulator output; and FIG. 15 shows the effect of bias boosting and quickly stabilizing the voltage during periods of radio frequency power followed by no radio frequency power.

DETAILED DESCRIPTION

FIG. 3 shows a block diagram of the present invention generally as (300). In FIG. 3, the radio frequency signal received at antenna 302 is clamped by a clamp 304 to protect against large voltage swings. This voltage is then rectified by rectifier 306, the DC output of which is provided to limiter 308. Limiter 308 clamps the rectifier voltage within +/−0.75V of the desired regulated output voltage. This voltage is then fed into voltage regulator 310 which provides a finer control and regulates the voltage within +/−10% of an absolutely fixed value, such as a band gap voltage, which is then used to supply capacitor CL, which supplies power to the chip. In view of the fact that the RFID chip typically operates on a current of less than 2 uA, the quiescent current of the regulator and limiter needs to be limited to about 100 nA where the input RF signal is at its weakest level. Regulators utilizing low quiescent currents typically result in regulators having low bandwidth. However, because of the environment the regulator operates in, it has to recover from periods where there is no RF energy, such as the sending of a logic (0), to a full blast of radio frequency energy, a higher bandwidth regulator is required. The dynamic biasing technique discussed hereinbelow boosts the bandwidth of the regulator.

Figure 1:
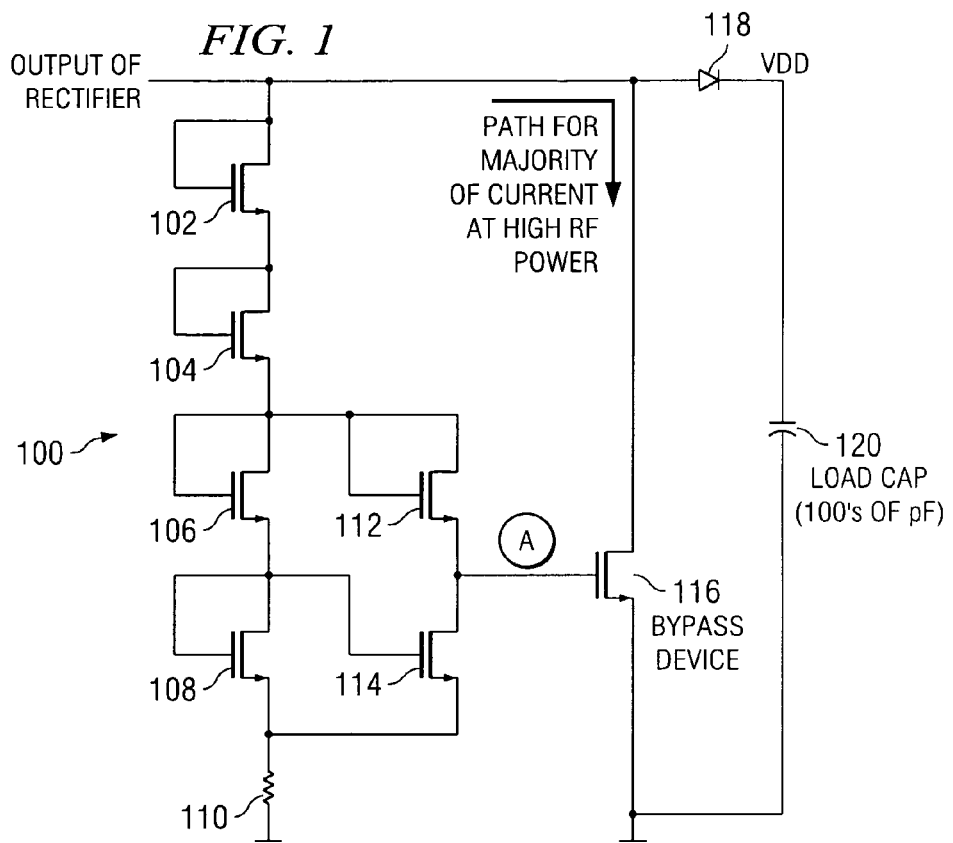
FIG. 1 is a schematic diagram of a clamp utilized in the prior art.
Figure 2:
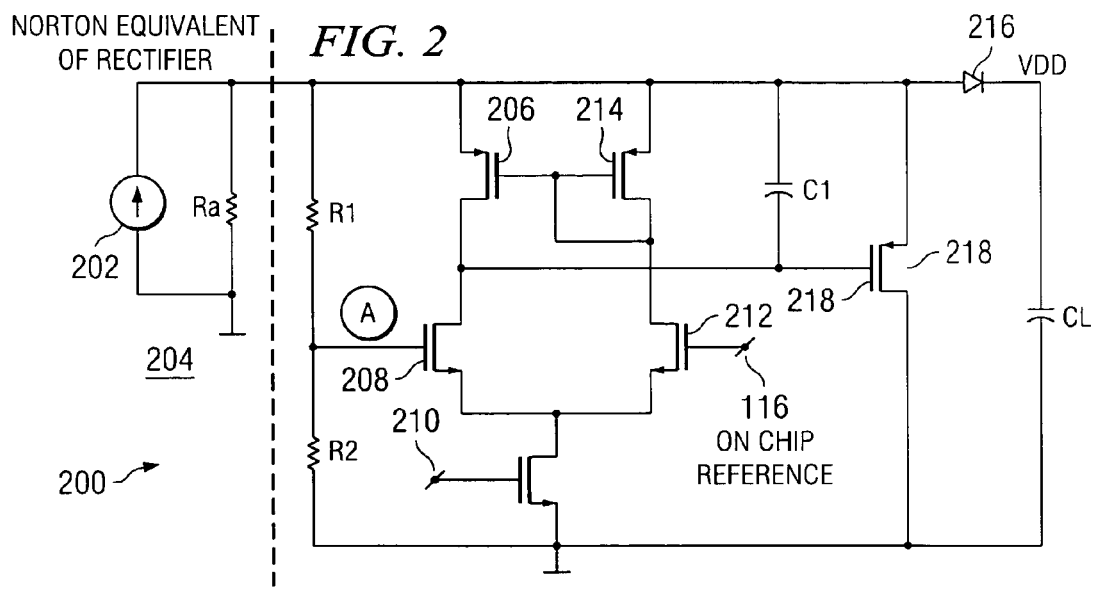
FIG. 2 is an improved version of the clamp shown in FIG. 1.

The limiter shown in FIG. 2 utilizes a Norton equivalent of the rectifier 204. The equivalent resistance is low with high radio frequency power and high at low radio frequency power. For example, the I equivalent for current source 202 could be between 4.6 uA to 1 mA and the R equivalent of resistor $R_a$ can be between 400 KΩ to 14 KΩ. Therefore, without any clamping, the no low voltage seen at the rectifier output could be as high as 14V which would clearly damage submicron circuits which have a maximal allowable voltage of 1.5V. In order to obtain good clamping characteristics, the input resistance of the voltage limiter should always be smaller than the Norton resistance, REQ. In this way, all the current flows through limiter, which then serves as an effective bypass path.

Referring now to FIG. 4, a limiter suitable for use with the present invention is shown generally as 400. Coupled between the output of the rectifier and a reference voltage are two diodes, 402, 404 in series with a diode connected transistor 406. The diodes that are utilized are p-n junction diodes whereas the diode connected transistor is a MOS transistor. These p-n junction diodes are implemented using the n+ source-drain and the p-well diffusions of a standard PMOS process. The MOS-diode is used in the primary path instead of another p-junction diode, in order to provide a good current sensing element which can then be used to dynamically bias the regulator. The current through the MOS diode 406 is mirrored inside the limiter to achieve better control of the slope of the limiter output voltage. The current mirror comprises transistors 410, 412, 414, 416, 418 and 420 having resistors R1, R2, R3, R4, R5, and R6, respectively. A diode 408 is connected to the series with a resistor Ro between the input voltage from the rectifier and the series connected diodes 402, 404, and 406 and the current mirrors which are connected in parallel between the distal end of the resistor Ro and the reference potential. A diode 424 is placed is series between this node and the output of the limiter circuit.

FIG. 5(A) shows a sketch of how the I-V characteristics of the limiter will be with just one leg of the mirrored current; as can be seen in the figure, this results in a steeply falling curve 500 starting at point 510. In FIG. 5(B) the curve 550 shows the results with a mirrored current having six legs. As the current through the MOS-diode increases, the current in the various legs increases. The voltage drop across each of the resistors R1-R6 increases and ultimately their $V_{ds}$ collapses below $V_{dsat}$ and their currents are clamped one by one starting with the leg containing the resistor R1 and transistor 410. This give a smoother piecewise linear slope 560 shown in FIG. 5 (B).

FIG. 6 shows the simulated I-V characteristics of the limiter. As can be seen from the sole curve in FIG. 6, that beyond an input current of 2 mA, all of the legs have been saturated, and the voltage again starts to rise, now dominated more by the series resistance of the p-n junction diodes than by the $V_{GS}$ of the MOS transistors.

FIG. 7 shows the regulator of the present invention. The power supply to the regulator marked pre-reg is the output of the limiter which can be as high as 2.2V under the worse case conditions, that is, low temperature, maximum output power and weak NMOS transistors. The pass transistor is driven by the output of unity gain amplifier 708 which is driven by the pre-regulated voltage and coupled via fixed current source 710 to ground. A second bias input is a variable current source 712 connected also to ground. The output of the pass transistor is coupled to storage capacitor 706 which had its distal end coupled to ground. The node at the connection of the pass transistor and capacitor 706 is also coupled ground via variable current source 704 one terminal of which is also connected to ground. The regulator voltage is coupled via a resistor string of resistors R1, R3, R2 and through diode-connected PNP transistor Q1 to ground. The bandgap voltage $V_{ptat}$ generated across resistor R3 is coupled to the input of error amplifier 734 at the gates of transistors 726 and 728. Transistor 728 has a width/length ratio which is twice that of transistor 726 to skew the input to provide an intentional offset. In this sub-threshhold range their I-V characteristics are exponential and therefore, this offset is a PTAT (Proportional To Absolute Temperature) voltage. This small PTAT voltage is scaled using resistors R1 and R2 to generate a larger PTAT voltage which is then summed with the $V_{BE}$ of Q1 to produce a bandgap voltage at the output. The error voltage comprises diode-connected PMOS transistor 716 connected to the pre-regulated voltage and having its gate tied to the gate of PMOS transistor 718 which has its drain coupled to the input of the unity gain buffer 708 as well as the drain of NMOS transistor 724. The drain of transistor 716 is connected to the drain of NMOS transistor 722 the gate of which is connected to the gate of transistor 724 and an on-chip voltage reference. A suitable startup circuit 714 is also provided.

The circuit shown in FIG. 7 has two-types of current sink, a normal current sink 730 and a variable current sink 732. The normal sink has a near constant value of 30 nA (nominal) which provides just adequate bias during low radio frequency power for the regulator to be functional. The dynamic current sink consists of a degenerated transistor, which is shown in FIG. 8 generally as 800. The gate of the MOS transistor is controlled by the MOS-diode 406 shown in FIG. 4. At low values of current in the MOS diode 406 that is common with the radio frequency power is low, the degeneration is not significant and the mirroring is 1:1. However, at high values of current in the MOS diode 406, the mirrored current is limited by the degenerating resistor. This dynamic current boosts the bandwidth of the regulator by increasing the transconductance of all of the transistors. The bandwidth is limited to a certain frequency because the presence of parasitic poles beyond this frequency can decrease the phase margin of the circuit.

The unity gain amplifier 708 isolates the larger $C_{GS}$ of the pass device from the node B and pushes the pole formed at node B further away, to further increase the stability of the circuit. The unity gain buffer is a simple differential amplifier with current mirror loads having its output connected to the negative input, thus achieving unity gain. A suitable circuit is shown in FIG. 9, generally as 900.

An important aspect of the present invention is that the feedback will be properly compensated for a high degree of stability. The load current for the regulator can vary from 0 to 10 uA and the rectifier's output current can vary from 4.6 uA to 1 mA which makes providing stability to the regulator challenging. FIG. 10(A) shows a simplified diagram of the feedback loop. In FIG. 10(A), "gm2" refers to the transconductance of the pass device 702. The block shown as "gm1" consists of the differential pair 726, 728 of FIG. 7. Alpha denotes the division ratio in the resistor string which has the value:

$$\alpha = \frac{R3}{R1+R2+R3} = \frac{1}{30} \quad \text{Equation 2}$$

"Cp1" interstage parasitic capacitance which is usually small and less than 50 pF. "Cc" is a 2 pF compensation capacitor and "CL" is a 250 pF load capacitor. Node "A" is a virtual ground due to the low impedance of transistor 724. Therefore, whatever current flows into node "A" comes out of the drain of transistor 724. Therefore, the circuit shown in FIG. 10(A) can be redrawn as shown in FIGURE (B) for ease of analysis. The detailed stability analysis which follows herein below has been done to prove that the circuit of the present invention is stable across a wide range of loads from 0 to 10 uA and rectifier output currents from 4.6 uA to 1 mA. The dynamic bias current saturate at about 10 uA for high rectifier output currents. Given this much variation, a brute-force simulation of loop gain across all corners is not a good idea. A better way to study this circuit is by analyzing the generic expression for loop gain and studying how the poles and zeros move with load and with dynamic bias.

FIG. 11 is a more detailed version of FIG. 10(A) and will be used hereinbelow in the loop gain analysis.

For the purpose of determining the loop gain, a few valid assumptions have been made. It is assumed that Cp1(50 fF)<<Cc(2 pF)<<CL(250 pF). With these assumptions having been made, the Loop Gain LG is:

$$LG = -\frac{\alpha \cdot gm_1 \cdot r_{o1} \cdot gm_2 \cdot R_L}{s^2 \cdot C_L \cdot C_{p1} \cdot r_{o1} \cdot R_L + sR_L(C_L + C_c \cdot r_{o1} \cdot gm_2) + 1} \quad \text{Equation 3}$$

The pole due to the unity-gain buffer is also neglected in this expression because it lies far above the unity-gain frequency and causes very little phase degradation at unity-gain. It can be seen at the poles vary with load current due to the change in RL and gm2 and the dynamic bias due to the change in gm2. For the system to be stable, the poles have to lie far apart thereby making one of them dominant. The distance they should be apart is a function of the DC loop gain. If the DC loop gain is given by Ao, the poles by ωp1 and ωp2, with ωp1<<ωp2, the loop gain expression can be simplified as shown in Equation 4:

$$LG = \frac{A_o}{(1+s/\omega p1) \cdot (1+s/\omega p2)} \approx \frac{A_o \omega p1}{s \cdot (1+s/\omega p2)} \quad \text{Equation 4}$$

$$\omega u = A_o \omega p1$$

For a phase margin greater than 45 degrees, the secondary pole has to be greater than the unity gain frequency ωu. The phase margin approaches 90 degrees if ωp2>>ωu.

$$\frac{\omega p2}{A_o \omega p1} > 1 \quad \text{Equation 5}$$

With the sufficient solution of good stability established by Equation 5, the loop-gain expression in Equation 3 is analyzed to find the sweet-spot where the phase margin is minimum. If one makes sure this minimum phase margin is over 45 degrees, then unconditional stability is attained at all combinations of load currents ($I_L$ and $I_{dyn}$). The characteristic polynomial in Equation 3 has two extremes, large and small currents through the pass device ($I_L$ and $I_{dyn}$) such that:

$$C_c \cdot r_{o1} \cdot gm_2 >> C_L$$

$$C_c \cdot r_{o1} \cdot gm_2 << C_L \quad \text{Equation 6}$$

For all of the extreme cases, good stability is verified using the test condition in Equation 5 and the minimum phase margin occurs when:

$$C_c \cdot r_{o1} \cdot gm_2 = C_L \quad \text{Equation 7}$$

The pole locations will now be calculated. For low Low $I_L$ and Low $I_{dyn}$ (CL>>Cc.ro1.gm2). The poles to this case are given by:

$$\omega p1 = \frac{1}{R_L \cdot C_L} \quad \text{Equation 8}$$

$$\omega p2 = \frac{1}{r_{o1} \cdot Cp1}$$

Applying the test condition:

$$\frac{\omega p2}{A_o \omega p1} = \frac{R_L \cdot C_L}{\alpha \cdot gm_1 \cdot r_{o1} \cdot gm_2 \cdot R_L(r_{o1} \cdot Cp1)}$$

$$= \frac{C_L}{\alpha \cdot gm_1 \cdot r_{o1} \cdot gm_2(r_{o1} \cdot Cp1)}$$

$$\gg 1$$

Equation 9

In view of the fact that gm1 and gm2 are very small at low values of $I_L$ and $I_{dyn}$, the poles are far apart and the system is very stable with a large phase margin.

For the case which $I_L$ is high and $I_{dyn}$ is low, or $I_L$ is low and $I_{dyn}$ is high, the current for the pass device is the sum if $I_L$ and $I_{dyn}$, so that gm2 depends only on the sum $I_L+I_{dyn}$. Therefore, if either is high, CL<<Cc.rol.gm2, the poles will then be given by:

$$\omega p1 = \frac{1}{C_c \cdot gm_2 \cdot R_L \cdot r_{o1}}$$

$$\omega p2 = \frac{C_c}{C_{p1}} \frac{gm_2}{C_L}$$

Equation 10

Applying the test condition:

$$\frac{\omega p2}{A_o \omega p1} = \frac{gm_2}{gm_1} \frac{Cc}{\cdot C_{p1}} \frac{Cc}{C_L} \frac{1}{\alpha}$$

$$= \frac{f(I_L + I_{dyn})}{f(I_{dyn})} \frac{Cc}{\cdot C_{p1}} \frac{Cc}{C_L} \frac{1}{\alpha}$$

$$= \frac{f(I_L + I_{dyn})}{f(I_{dyn})} \frac{2pF}{50 fF} \frac{2pF}{250pF} \frac{1}{1/30}$$

Equation 11

The expression in Equation 11 is at a minimum when $I_{dyn}$ is large and $I_L$ is small in which case the expression has the value of 9.6>1. Thus, even under these three combinations of $I_L$ and $I_{dyn}$ the poles are far apart and the system is stable although it does not have as good as phase margin as described above.

Therefore, it can be concluded that instability occurs while the poles are closest to each other and this occurs at a value of $I_L+I_{dyn}$ such that gm2=(CL/Cc).ro1. If this value of $I_L+I_{dyn}$ is denoted by $I_{crit}$, the maximum DC gain and hence the minimum phase margin results when gm1 is maximum with $I_L+I_{dyn}=I_{crit}$. Since gm1 has does not depend on $I_L$, gm1 is maximum when $I_{dyn}$ is maximum. Therefore, the minimum phase margin occurs when at $I_L=0$ and $I_{dyn}=I_{crit}$.

In order to verify the mathematical analysis previously described, a parametric simulation of loop gain was performed on the regulator and limiter combination for various combinations of load currents and rectifier output currents. The phase margin thus obtained was plotted in FIG. 12 as a function of the rectifier current $I_{eq}$. Although the analysis made an explicit reference to the dynamic bias, $I_{dyn}$, the independent variable used here is $I_{eq}$ with $I_{dyn}$, being a certain variable fraction of $I_{eq}$. At low values of $I_{eq}$ and hence $I_{dyn}$, and IL, the phase margin is very good approaching 90 degrees at low current, just as predicted by the analysis. At intermediate values of $I_{eq}$, the phase margin falls to a minimum. Further, as predicted, the lower the value of IL at this point, the worse the phase margin gets, although by just a few degrees. At large levels of $I_{eq}$, $I_{dyn}$ saturates and so does the phase margin. The unity gain frequency of the open loop, which is also the bandwidth of the closed loop, is shown in FIG. 13. At high values of $I_{eq}$, the bandwidth saturates to gm1/α .Cc because $I_{dyn}$ saturates.

FIG. 14 illustrates the bandwidth and slew-boosting of the circuit and FIG. 15 shows the affect of boosting the bias quickly to stabilize the voltage during periods of radio frequency power followed by periods of no radio frequency power. The bias boosting provides stabilizes the output very quickly for stable voltage whereas the absence of bias boosting causes cause transients of long duration which can damage devices on the chip.

While the invention has been shown and described with reference to preferred embodiments thereof, it is well understood by those skilled in the art that various changes and modifications can be made in the invention without departing from the spirit and scope of the invention as defined by the appended claims.

The invention claimed is:

1. A voltage regulation circuit for an RFID circuit comprising:
    a voltage limiter circuit having a current sensing element for sensing current through the voltage limiter circuit, the voltage limiter generating a limited voltage;
    a voltage regulator coupled to the limited voltage for generating a regulated output voltage, the voltage regulator having a dynamic biasing current responsive to an output of the sensing element for increasing bandwidth of the voltage regulator when current in the voltage limiter circuit increases.

2. The voltage regulation circuit of claim 1 wherein an input voltage to the voltage limiter circuit is a rectified output of an electromagnetic wave signal received by the RFID circuit.

3. The voltage regulation circuit of claim 2 wherein the voltage limiter comprises a plurality of current mirror-connected transistors, each of the transistors having a weighing resistor in its current path.

4. The voltage regulation circuit of claim 3 wherein the current sensing element is a diode-connected MOS transistor.

5. The voltage regulation circuit of claim 2 wherein each of the transistors has a different value weighting resistor.

6. The voltage regulation circuit of claim 5 wherein the current sensing element is a diode-connected MOS transistor.

7. The voltage regulation circuit of claim 2 wherein the current sensing element is a diode-connected MOS transistor.

8. The voltage regulation circuit of claim 1 wherein the voltage limiter comprises a plurality of current mirror-connected transistors, each of the transistors having a weighting resistor in its current path.

9. The voltage regulation circuit of claim 8 wherein each of the transistors has a different value weighting resistor.

10. The voltage regulation circuit of claim 9 wherein the current sensing element is a diode-connected MOS transistor.

11. The voltage regulation circuit of claim 8 wherein the current sensing element is a diode-connected MOS transistor.

12. The voltage regulation circuit of claim 1 wherein the current sensing element is a diode-connected MOS transistor.

13. The voltage regulation circuit of claim 1 wherein the circuit is built utilizing deep submicron CMOS technology.

14. The voltage regulation circuit of claim 1 wherein the dynamic bias current is provided by a degenerated transistor.

15. The voltage regulation circuit for an RFID circuit of claim 1 further comprising an RFID circuit coupled to an output of the voltage regulation circuit.

* * * * *